United States Patent Office 3,466,144
Patented Sept. 9, 1969

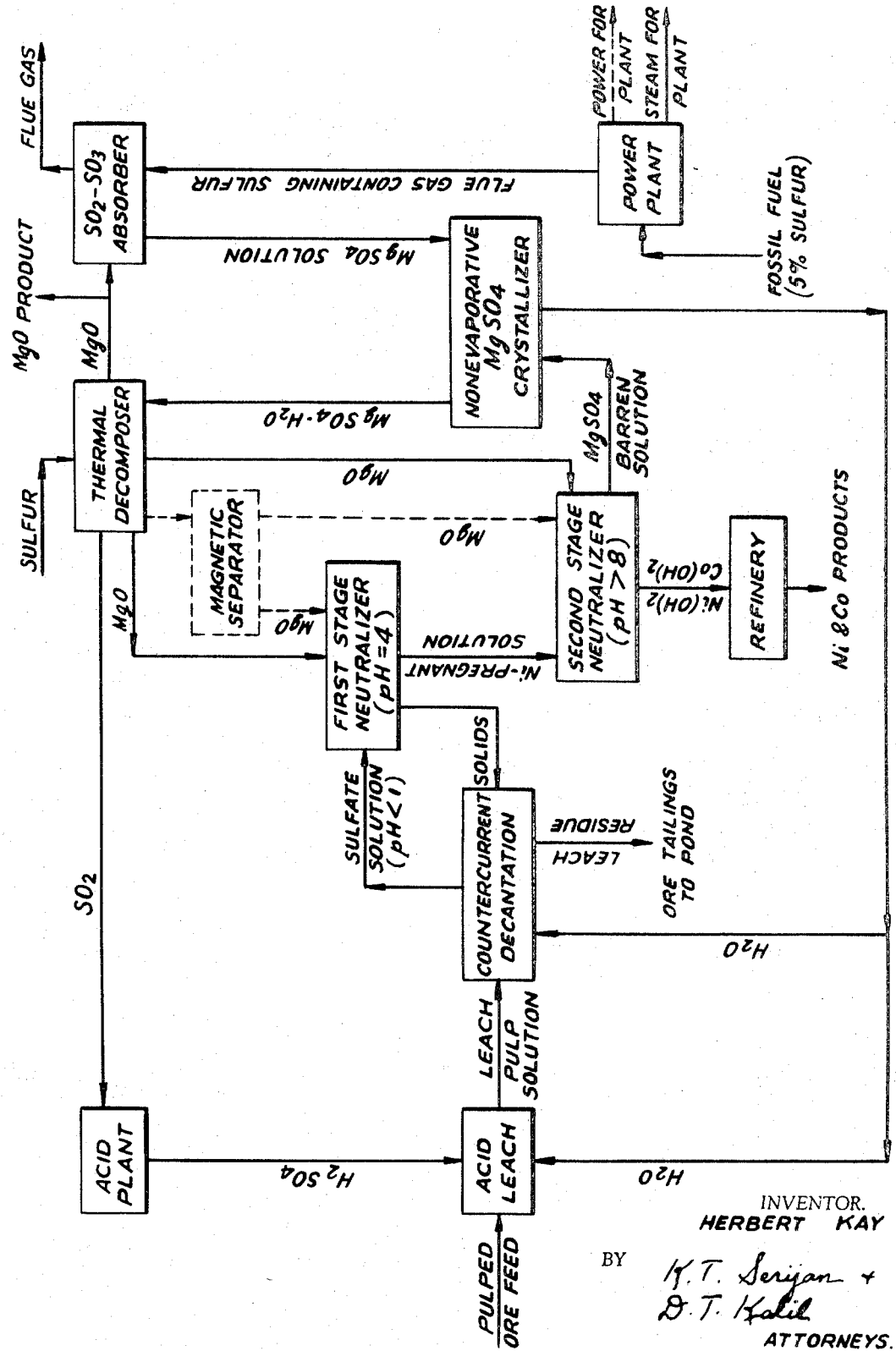

3,466,144
TREATMENT OF NICKELIFEROUS OXIDIC MATERIALS FOR THE RECOVERY OF NICKEL VALUES
Herbert Kay, New York, N.Y., assignor to American Metal Climax, Inc., New York, N.Y., a corporation of New York
Continuation-in-part of application Ser. No. 633,158, Apr. 24, 1967. This application July 3, 1967, Ser. No. 655,264
Int. Cl. C01g 53/04
U.S. Cl. 23—183    15 Claims

ABSTRACT OF THE DISCLOSURE

A hydrometallurgical process using a sulfuric acid leach or a sulfation roast with a water leach for the recovery of nickel values from oxidic materials containing up to 12% magnesia wherein the leach solution is contacted with magnesia to precipitate nickel which is separated from the solution containing $MgSO_4$ before converting to nickel product. The $MgSO_4$ in the remaining solution is nonevaporatively crystallized at 370° to 480° F. under a pressure of 160 p.s.i.g. or more. The crystallized material $$(MgSO_4.H_2O)$$

is thermally decomposed in the presence of sulfur-bearing material and the decomposition products are returned to the process.

---

The present application is a continuation-in-part of my copending application Ser. No. 633,158, filed Apr. 24, 1967, now abandoned.

The present invention relates to nickel-containing ores and, more particularly, to the treatment of nickel-containing ores of a kind broadly classified as oxide nickel ores.

As is pointed out in the 8th edition of the Metals Handbook, volume 1, page 1113, the nickel-bearing ores of commercial significance have been classified into two major groups, i.e., sulfide ores and oxides ores. The sulfide ores can be further classified as (a) millerite, a nickel sulfide [NiS] mineral, (b) pyrrhotite, a nickel-bearing ferrous sulfide [FeS] mineral which is magnetic, (c) pentlandite, an iron-nickel sulfide [(Fe, Ni)$_9$S$_8$] mineral, and (d) chalcopyrite, a nickel-bearing copper-iron sulfide [CuFeS$_2$] mineral. Some of these nickel-bearing sulfidic minerals are associated with each other. For example, pentlandite is associated with chalcopyrite in some Canadian ores and these ores are said to contain between 1 and 3% of copper plus nickel.

Like the nickeliferous sulfide ores, the nickel-bearing oxidic ores, including those oxidic ores sometimes referred to as "silicate ores," can be further classified into two broad categories, i.e., the magnesium silicate group which includes the garnierites and the nickeliferous serpentines and the laterite group which includes limonite, a hydrous ferric oxide, and iron hydroxide with or without aluminum hydroxide. Each of the foregoing ores is characterized by a considerable diversity of analysis in the same deposit although each of them usually contains some iron, e.g., as much as 50%, and cobalt. In addition, these ores may also contain varying amounts of chromium, copper, magnesium, manganese and/or aluminum.

Obviously, there are chemical, metallurgical, physical and/or compositional variations or differences between the sulfide and the oxide ores, between the various sulfide ores and between the various oxide ores. In addition, variations or differences may even exist in the same ore depending on the specific deposit and/or its geographical location. Accordingly, the art relating to the treatment of nickel-bearing ores has primarily been directed to designing specific processes to fit a particular type of ore and/or ore body taking into consideration such factors as geographical location, availability of power, raw materials and costs including transportation, reagent and capital costs. For example, one sulfide ore process of the prior art comprises concentrating ground or finely divided ore by flotation and magnetic separation. The concentrate is then submitted to partial roasting and then smelted in order to produce a raw matte of nickel sulfide. Subsequently, the matte is Bessemerized, i.e., the iron present in the matte is oxidized and pyrometallurgically treated. The final product is then produced by electrolytic refining. Such a process is of course not feasible for all types of ores and all geographical locations.

As an alternative to electrolytic refining, the art has also devised another refining method comprising converting the furnace-treated nickel to its carbonyl and then volatilizing to yield nickel powder. However, this refining method suffers from the disadvantage of requiring expensive precautions to guard against the detrimental characteristics of the nickel carbonyl.

Another process which attempted to vitiate the high costs of electrolytic refining involves oxidation of the sulfide ore followed by ammonia leaching to produce soluble nickel, cobalt and copper powders. The difficulty with this hydrometallurgical process is that it may be too expensive since reagent requirements may be too high particularly where ammonia is not readily available. Furthermore, this process produces an ammonium sulfate by-product which, if it cannot be sold, may upset the economics of the process.

As would be expected, the art adapted processes specifically designed for treating nickeliferous sulfide ores to the oxide ores as is evidenced by processes for treating high-grade oxide ores such as garnierite. These ores have been generally blast-furnace smelted to produce ferronickel or smelted with a sulfurous agent to produce matte which is then Bessemerized to remove iron before roasting to form nickel oxide. These processes, like the sulfide ore pyrometallurgical processes, are impractical for certain geographical locations where fuel, sulfurous agent and/or powder would be too costly.

Attempts to provide hydrometallurgical processes for the treatment of nickel-bearing oxidic ores, particularly the low-grade ores found in Cuba and New Caledonia, have also been made. But they too suffer from drawbacks which have inhibited their use. For example, one of the processes included drying the ore and then breaking it in hammer mills to 90% minus 100 mesh particle size and the nickel in the ore was selectively reduced with producer gas while the iron oxides were only reduced to ferrous oxide or magnetite ($Fe_3O_4$). The resulting calcine was then subjected to the action of ammonia-ammonia carbonate agitated by air to form a soluble nickel ammonia complex while the other metals remained in solid form. The solution was next evaporated to recover ammonia and the nickel carbonate formed was calcined to oxide. In view of the price of ammonia and the relatively low yield of nickel product, this process may be economically unsound for many ores, particularly those quite remote from the main markets.

From the foregoing, it is clear that none of the processes used for sulfide ores can effectively be used for treatment of the relatively low-grade nickeliferous ores. As those skilled in the art will appreciate, the conditions for treatment of oxide ores are fundamentally different from those encountered for the sulfide ores. Furthermore, transformation of oxide ores into sulfides would appear to be uneconomical.

In the same connection, none of the previously discussed prior art treatments of oxidic ores is entirely satisfactory for all oxide ores wherever located and whatever their compositon. Thus, the pyrometallurgical treatment of garnierite, which has a low iron-to-nickel ratio, has little applicability to the treatment of laterites, which have a much higher iron-to-nickel ratio. Likewise, processes relying on electricity have no commercial applicability to ore bodies located in areas where electricity is costly.

Even the prior art hydrometallurgical processes cannot be adopted as is, since, in the case of the ammonia-leaching process, the economics are unfavorable because of high investment costs, ammonia consumption and low nickel recovery. The low nickel recovery is probably due to the silica and magnesia content of the ore. That is, the silica, magnesia and nickel form an insoluble forsterite (the magnesium-rich member of the isomorphous olivine group of minerals probably having the formula $Mg_2SiO_4$) from which nickel cannot as yet be recovered by a commercially feasible industrial process.

It is therefore clear that what the art needs for the treatment of relatively low-grade nickeliferous oxidic ores of the laterite type, including those ores containing as much as 10 to 12% magnesia, in a hydrometallurgical process that makes an economic use of commonly available reagents which are easily regenerated with minimal loss and which process produces a high yield of nickel product of good quality. Although many attempts have heretofore been made to provide such a process, none, as far as I am aware, was entirely successful when carried into practice on a commercial scale.

It has now been discovered that a novel hydrometallurgical process for recovering nickel, cobalt and/or nickel and cobalt values from nickeliferous oxidic materials may be provided which process comprises a unique combination of steps using and reusing, by means of a novel reclamation and/or regeneration cycle or cycles, special selective reactants in carefully controlled amounts.

It is an object of this invention to provide an improved process whereby nickel, cobalt and/or nickel plus cobalt can be economically leached from nickeliferous oxidic materials, including ores and concentrates thereof, using sulfuric acid made in part from ingredients used in the process.

It is another object of this invention to provide an improved nickel-recovery process utilizing an acid leach which produces a commercially acceptable nickel product with satisfactory yields.

A further object of this invention is the provision of a unique process involving special reagent-recovery stages for the selective recovery of nickel, cobalt and/or nickel plus cobalt, individually or collectively, from nickeliferous oxidic materials wherein the nickel-bearing materials are leached with sulfuric acid or, alternatively, sulfated, e.g., with sulfuric acid, by roasting or baking and leached with water and selective recovery is accomplished by a one- or two-stage neutralization using magnesia in one or each of the two stages as described, for example, in U.S. Patent No. 2,899,300.

Still another object of the present invention is to provide effective and economic means for regenerating the magnesia used in the one- or two-stage neutralization.

Among the further objects of the invention disclosed herein is the provision of a special process for recovering magnesium sulfate from dilute solutions and recovering the magnesium sulfate in a special state, form and/or morphololgy and with good yields.

One of the other objects of this invention relates to the provision of a new process for obtaining magnesia as well as sulfur dioxide from magnesium sulfate in the form of crystals or otherwise using special materials under specially controlled conditions, which process is particularly adapted to be used in conjunction with a nickel-recovery method involving a sulfuric acid leach step and a neutralization step or steps using magnesia.

A still further object of the invention is to provide an economic hydrometallurgical process for recovering nickel frpm nickeliferous oxidic ores containing iron and up to 12% magnesia, which process is characterized by producing a high yield of a commercially acceptable nickel product and which is further characterized by minimization of reactant losses.

Other objects and advantages will become apparent from the following description taken in conjunction with the accompanying drawing in which a process within the contemplation of this invention is depicted in flow-diagram form.

Generally speaking, the present invention contemplates a unique sulfuric acid-leach hydrometallurgical process for recovering nickel, cobalt and/or nickel plus cobalt values from nickeliferous oxidic materials, e.g., ores and concentrates, containing as much as 50% or more iron oxide and up to 12% magnesia, e.g., 10% but, advantageously, less than 8%, which process involves special steps in a particular sequence all designed to produce a good quality product with high yields and which process minimizes losses of necessary reagents. The important reagents of this invention which must be employed therein in substantial quantities are sulfuric acid and magnesia. Accordingly, the present invention also contemplates the replenishment of sulfuric acid and magnesia with minimal use of makeup ingredients, e.g. sulfur. In addition, since the magnesia is transformed into magnesium sulfate, the present invention contemplates a process for reclaiming the magnesium sulfate from solution as well as regenerating magnesia from magnesium sulfate.

A process, in some of its broader aspects, to which the present invention is particularly applicable, comprises leaching a nickeliferous oxidic material with sulfuric acid ($H_2SO_4$) at an elevated temperature and pressure, separating the insolubles, e.g., the gangue including some of the iron, aluminum and silica, from the leach sulfate solution containing the nickel and cobalt values, raising the pH of the solution from less than about 1 to between 3.5 and 5, advantageously, between 3.5 and 4.5 by adding lime or, more advantageously, magnesia (MgO) thereto so that elements such as iron, aluminum and silicon are precipitated while the nickel, cobalt and manganese, if present, values remain in solution, separating the precipitate from the nickel- and cobalt-pregnant solution, adding magnesia (over and above any magnesia previously added) to the pregnant solution until the pH is at least 7 and, advantageously, at least 8 in order to precipitate the nickel and cobalt values and separating the insoluble nickel and cobalt hydroxide precipitate from the now barren magnesium sulfate ($MgSO_4$) solution, i.e., substantially barren as to nickel and cobalt. Of course, as those skilled in the art will appreciate, the same point in the process may be reached using a single-stage neutralization with magnesia.

Heretofore, it has been suggested that the $MgSO_4$ solution then be subjected to evaporation to recover the magnesium usually as heptahydrate crystals. However, according to this invention, the barren $MgSO_4$ solution is then subjected to a reclamation cycle comprising nonevaporative crystallization of the $MgSO_4$ in solution to form particulate crystals of $MgSO_4$ having one water of hydration, i.e., the monohydrate, by subjecting the barren solution to elevated pressures, i.e., 200 to 500 pounds per square inch gauge (p.s.i.g.), while at temperatures of between 370° and 480° F. Advantageously, the barren solution, which has a pH of about 7.8 to 8.4, is seeded with magnesium sulfate crystals and/or MgO to (a) increase the rate of crystallization, (b) inhibit corrosion of equipment if MgO is added since the pH, after crystallization begins, appears to indicate an acidic solution, probably $H_2SO_4$, and this solution may present corrosion problems, (c) lower the solubility of the $MgSO_4$, and (d) improve the yield of $MgSO_4$ crystals. Optionally but more advantageously, the $MgSO_4$ crystals (which are surprisingly in the very desirable monohydrate form instead of the less desirable, but expected, heptahydrate form) are then subjected to thermal decomposition in the presence of a sulfur-bearing substance. Advantageously, the sulfur-bearing substance is selected from the group consisting of brimstone (native sulfur), sulfur, pyrite (iron disulfide, $FeS_2$) and combinations thereof to which kieserite $$(MgSO_4 \cdot H_2O)$$

may be advantageously added if greater sulfur yields are desired. The products of the decomposition are sulfur dioxide ($SO_2$), perhaps some sulfur trioxide ($SO_3$) and MgO, each of which may be recycled into the process of this invention.

Each of the foregoing steps of this novel process and each of the materials employed therein contribute importantly to the success of the overall process in recovering nickel, cobalt and/or nickel plus cobalt values for nickeliferous oxidic materials in an economic and commercially feasible manner. However, one of the more important features of this invention revolves around the discovery of a means for reclaiming $MgSO_4$ from the barren $MgSO_4$ solution in the form of its monohydrate in a very desirable particle size and shape without having to use evaporation methods and all the difficulties and expense of such methods. In the same connection, the reclamation of magnesium sulfate feature of this invention greatly assists in making the recovery of nickel from relatively low-grade lateritic ores competitive even with nickel recovery from sulfidic ores such as pentlandite.

The reclamation means of this invention is based upon the decreasing solubility of $MgSO_4$ in dilute solutions with increasing temperature. For example, the solubility of $MgSO_4$ at 153° F. is 500 grams per liter (g.p.l.), at 212° F. is 430 g.p.l. and at 383° F. the solubility is only 20 g.p.l. However, it is not enough to merely raise the temperature since the water of the barren solution, of course, evaporates at around 212° F. Accordingly, it is necessary to have a pressurized system to bring the temperature up to at least 370° F. without evaporation and the pressure required to preclude evaporation at 370° F. would be about 160 p.s.i.g. At higher temperatures, higher pressures would be required. In other words, the minimum pressure required to forestall evaporation is equal to the vapor pressure of the solution at any given operating temperature and the temperatures contemplated by this invention are between 370° F. and 480° F. and, advantageously, between 390° F. and 470° F. for optimum results. If the foregoing temperatures are adhered to and an appropriate pressure is impressed upon the system, a magnesium sulfate monohydrate product is obtained. This product, when all the process conditions of this invention are followed, is substantially spherical and has a particle size ranging from 20 to 150 microns. Thus, it has good flowability and is easier to handle.

The foregoing beneficial aspects of this invention provide a source of magnesia for the two-stage neutralization (selective precipitation), provide water for the system and even provide a source of sulfuric acid which is used to digest the oxidic material. For example, the nonevaporative magnesium sulfate crystal reclamation yields water besides the crystals. These crystals are subjected to thermal decomposition at a temperature of at least 1350° F. in the presence of a sulfur-containing substance, as previously discussed, as well as in a nonoxidizing gaseous atmosphere. The products of the decomposition are of course magnesia and sulfur oxide, e.g., $SO_2$ and $SO_3$. The sulfur-containing substance, which acts as a reductant, also provides an additional source of sulfur which is useful in replenishing the sulfuric acid supply required for leaching.

The employment of the foregoing process steps in the recovery of nickel, cobalt and/or nickel plus cobalt from relatively low-grade nickeliferous oxidic materials has at least a seven-fold advantage. Firstly, nickel, cobalt and/or nickel plus cobalt are recovered in a relatively pure state, i.e., at least 99+% pure, and with excellent yields, i.e., 90% recovery of contained nickel and 90% recovery of contained cobalt. Secondly, iron is effectively separated from the nickel so that the nickel product is substantially devoid (less than 0.05%, e.g., less than 0.02%) of iron. Thirdly, there is little loss of magnesia so that magnesia requirements for replacement are minimal. Fourthly, sulfur requirements needed for sulfuric acid are supplied in part by the process features of this invention. Fifthly, the process produces a relatively pure nickel product without having to resort to pyrometallurgical and/or electrolytic techniques thus permitting the process of this invention to be applied to nickeliferous oxidic materials geographically located in areas where those techniques are not commercially feasible. Sixthly, and very importanly, the present process can be used on ore bodies containing as much as 12%, e.g., 10%, magnesia since there is little loss of reactants, e.g., much of the sulfuric acid can be recovered within the system. Seventhly, the process is designed to minimize the pollution of streams and air, e.g., by eliminating venting of the sulfur-containing gases, since almost everything is either recovered or reused except, of course, the gangue which presents only a small disposal problem.

The process of the present invention can be modified as those skilled in the art will appreciate. For example, while the foregoing process steps and their sequencing, reactants and conditions when combined with the novel reagent-recovery steps constitute the basic parts of this invention, other steps, different sequencing, additional or other reactants and/or conditions may be included to meet a particular need for a particular situation. Thus, if copper and/or lead are present in the nickeliferous oxidic material, the leach solution may be charged with hydrogen sulfide to precipitate any copper and/or lead present as sulfides after the step where MgO is added to bring the pH of the leach solution to 3.5 or 5. In the same connection, if gypsum-scaling, due to the presence of calcium, is likely to be a problem, it is advantageous to carbonate the barren $MgSO_4$ solution by adding magnesium carbonate with or without carbon dioxide to the sulfate solution. Advantageously, carbon dioxide is also added. Any calcium sulfate present in the $MgSO_4$ solution would thereby be precipitated as calcium carbonate while magnesium would remain in solution.

For the purpose of giving those skilled in the art a better appreciation of this invention and its advantages, the following details pertinent to this invention are set forth. In this connection, it is important to employ the following steps (as shown, in part, in the attached flow-diagram drawing) if optimum results are to be obtained on low-grade oxidic nickel ores using the double-stage magnesia neutralization in combination with the novel reagent-recovery steps of this invention.

(1) While the low-grade lateritic ores are usually earthy materials not requiring grinding, it is advantageous to scalp the ore (not shown in the drawing) to remove large pieces of gangue which are substantially free of nickel and cobalt values. The remaining ore feed has a particle size of less than minus 400 mesh. The remaining ore is then passed into a thickener (not shown) to form a pulped ore feed containing water, i.e., a slurry.

(2) Next, the slurry is heated to a temperature of between 400° and 500° F. while under a pressure of more than about 450 p.s.i.g. Advantageously, the heating is carried out in an autoclave. The thus heated slurry is then treated with $H_2SO_4$, i.e., the acid leach, and this causes most of the nickel, cobalt and manganese to go into solution as sulfates but the iron, aluminum and silicon remain substantially insoluble. For optimum results, the $H_2SO_4$ is concentrated, e.g., 93% $H_2SO_4$, so that the system contains less water. The temperature and pressure conditions of this step are very important since (a) if they are maintained, the reaction rate is accelerated and (b) the iron precipitates at the higher temperature and does not precipitate at lower temperatures, e.g., below about 400° F. In this connection, the iron appears to remain in the ferric state if manganese is present in the ore.

(3) The solids (gangue including iron, aluminum and silicon) are then separated from the solution containing the great bulk of the nickel and cobalt values by known means although it is preferred that countercurrent decantation be employed. Advantageously, the unseparated leach solution is cooled prior to the separation of gangue from solubles.

(4) Magnesia is added to the sulfate liquor, which has a pH of around 1, in a first-stage precipitator or neutralizer until the pH is brought up to between 3.5 and 4.5. Advantageously, the precipitation is carried out at elevated temperatures, i.e., 50° C. to 100° C. The result of this MgO addition is to precipitate amphoteric elements such as the remaining iron, aluminum and silicon while substantially all of the nickel and cobalt values as well as manganese, if present, remain in solution as sulfates. The foregoing desirable selective precipitation of undesirable ingredients is not cleanly attained if the pH is less than 3.5 or greater than 5, e.g., 4.5. For example, if the pH is less than 3.5, some of the iron and aluminum remain unprecipitated while, if the pH is raised to more than 4.5 or 5, some of the nickel and cobalt precipitate and may be lost. In this connection, the solids, after separation from the liquor, now barren of iron, aluminum and silicon, may be returned to the leaching step, e.g., the countercurrent decantation unit depicted in the drawing, of this process. Advantageously, the solids, e.g., iron and aluminum hydroxide, are separated by countercurrent decantation (not shown in the drawing) since they are very difficult to filter.

(5) The liquor from step 4 is subjected to a second-stage precipitation in another neutralizer involving contacting the pregnant solution, i.e., the liquor, with MgO until the pH is at least 8 in order to precipitate the nickel, cobalt and manganese, if present, out of solution. Advantageously, the precipitation is carried out at a temperature of 50° C. to 100° C. and, more advantageously, at a temperature of 70° C. to 95° C. The thus-formed hydroxides of nickel, cobalt and manganese are then separated, e.g., by vacuum filtration, from the barren solution containing $MgSO_4$ and the filter cake is washed with water before sending it to the refinery to lessen the amount of $MgSO_4$ and/or other solubles in the filter cake.

(6) The washed filter cake is refined by subsequently subjecting it to ammonia leaching with ammonium sulfate or, less advantageously, ammonium carbonate. More advantageously, ammonia is also added to either ammonium compound employed since it has the dual function of shifting the equilibrium to the right and speeding up the reaction. The ammoniacal addition, i.e., ammonium sulfate-ammonia or ammonium carbonate-ammonia, results in the formation of a nickel diamine sulfate complex.

(7) Next, the solution containing the nickel complex is exposed to a reducing agent, i.e., hydrogen, to bring down the nickel as nickel powder having a purity of over 99%. The resultant powder is then separated from the remaining solution containing cobalt values and is dried. The solution is fairly free of nickel values, i.e., it contains less than 5% of the nickel. Further additions of hydrogen or, advantageously, hydrogen sulfide bring down a cobalt product which is separated from the solution. The remaining liquor may be subjected to a regeneration cycle to recover ammonia as those skilled in the art will readily appreciate.

(8) The barren $MgSO_4$ liquor resulting from the second-stage precipitation (step No. 5) is then passed into a nonevaporative crystallizer, advantageously, an autoclave. The concentration of $MgSO_4$ in the barren solution, which is for all practical purposes devoid of nickel and cobalt values, is about 40 to 250 g.p.l., e.g., 50 to 200 g.p.l., although it can vary beyond those figures depending upon a number of factors, including the composition of the nickeliferous oxidic material. The nonevaporative crystallization is temperature- and pressure-sensitive so that care must be exercised in keeping the temperature from falling below 370° F. or above 480° F. Below 370° F., the solubility of $MgSO_4$ is too high and above 480° F. any advantages to be gained may be more than offset by the additional costs arising out of the higher temperatures. Advantageously, the nonevaporative crystallization temperature is 390° F. to 470° F. In this connection, the pressure to be employed is, as was mentioned hereinbefore, dependent on the temperature and the following table, which is based in part on experiments run on a batch scale on barren $MgSO_4$ solution, shows the relationship of temperature and solubility as well as pressure in four instances.

TABLE

| Temperature, (°F.) | Pressure, (p.s.i.g.) | $MgSO_4$ in solution, (g.p.l.) |
|---|---|---|
| 302 | | 215 |
| 338 | | 86 |
| 392 | 237 | 14 |
| 405 | 280 | 12 |
| 419 | 304 | 8 |
| 446 | 414 | 5 |

From the foregoing table, it is clear that the solubility of $MgSO_4$ decreases with temperature. As a matter of fact, at 212° F., the solubility is 430 g.p.l. so that a solution containing less than 430 g.p.l. (as would be encountered in the present process) would not crystallize any $MgSO_4$ except by evaporation. But at 446° F. and 414 p.s.i.g., it would precipitate over 90% of the contained $MgSO_4$ if the original concentration before crystallization was 60 g.p.l. Furthermore, precipitation or crystallization is obtained without evaporation at that temperature and pressure.

Experiments disclosed that the rate of precipitation at any given temperature is time-dependent. For example, at 392° F., it was discovered that there was an incubation period of 20 to 30 minutes before precipitation began and an additional 30 to 40 minutes to complete the precipitation. That is, before crystallization began the solution contained 60 g.p.l. of $MgSO_4$ and only 14 g.p.l. when precipitation came to a stop at a temperature of 392° F. In this connection, conditions for rapid precipitation in a continuously operating process would probably be more favorable because of the presence of seed crystals. To confirm, experiments were conducted on the rate of crystallization of $MgSO_4$ from a solution containing 51 g.p.l. of $MgSO_4$ where there was an abundance of magnesium sulfate crystals. These tests showed that precipitation proceeds immediately and that approximately 15 minutes residence time is all that is needed to complete the precipitation, i.e., to bring the concentration of $MgSO_4$ in solution at 392° F. down to 14 g.p.l. Accordingly, it is advantageous to crystallize $MgSO_4$ from solution in the presence of seed $MgSO_4$ crystals, whether supplied to the crystallizer externally or not. The product obtained by the $MgSO_4$ crystallization has a spherical morphology and consists of discrete particles (sometimes in aggregates) having a particle size ranging from 20 microns to 150 microns.

(9) During the crystallization set forth hereinbefore (step No. 8), it is advantageous to add magnesia to the solution since its addition improves the amount of recovery of $MgSO_4$ (in the form of the monohydrate) from solution. That is, instead of having a solution containing 14 g.p.l. of $MgSO_4$ after precipitation is complete at 392° F., the addition of magnesia lowers the amount of $MgSO_4$ in solution to only 3 g.p.l. at the same temperature of crystallization. The amount of magnesia needed to bring about such a phenomenon appears to be pH dependent. For example, at the completion of precipitation, but before cooling, the pH of the solution varies from about 2.2 to 2.9 depending on the amount of $MgSO_4$ originally in solution. When enough magnesia is added as a buffering agent to bring the pH up to 4.9, the amount of $MgSO_4$ still in solution is lowered to 8.9 g.p.l. instead of 14 g.p.l., which indicates better recovery of magnesium sulfate. Further additions of magnesia to bring the pH up to 5.2 again decreases the amount of $MgSO_4$ in solution to only 2.7 g.p.l. where crystallization is conducted under pressure and a temperature of 392° F. This compares very favorably with the 14 g.p.l. concentration of $MgSO_4$ at the completion of crystallization under the same conditions of pressure and temperature. As a matter of fact, it is better than a 300% improvement. Accordingly, magnesia is advantageously added to the $MgSO_4$ solution to bring the pH up to above 3.5 during crystallization of $MgSO_4$. More advantageously, enough magnesia is added to bring the pH above 4.5, e.g., 4.9, for even better recoveries of $MgSO_4$.

(10) The $MgSO_4 \cdot H_2O$ crystals from either step No. 8 or 9 are, advantageously after drying, e.g., in a kiln, subjected to thermal decomposition at a temperature of at least 1350° F. for at least 5 minutes, e.g., 1650° F. for at least 4 minutes. The decomposition is advantageously carried out using a sulfur-bearing compound as mentioned hereinbefore although hydrogen and/or carbon, in the form of coke, charcoal, carbon monoxide or otherwise, may also be used as those skilled in the art will readily understand. However, since one of the products of decomposition (the other being magnesia) is sulfur dioxide and/or sulfur trioxide, it is advantageous to use a sulfur-bearing substance. The sulfur gas is then passed into a sulfuric acid plant and the magnesia is, advantageously, broken down into 4 or 5 separate streams depending upon the amount of magnesia in the oxidic material being treated by this process. Two of the streams go into the first- and second-stage precipitators, respectively. A third stream is directed into a sulfur dioxide-sulfur trioxide absorber or scrubber to form magnesium sulfate which is recycled into the nonevaporative crystallizer. The absorber catches the flue gases which are the products of combustion from the power plant. The energy source is, advantageously, a fossil fuel containing more than 3%, e.g., more than 5% sulfur so that even the fuel contributes to the makeup sulfur for the process of this invention. The fourth stream of MgO can be directed into the nonevaporative crystallizer where it assists in improving the recovery of $MgSO_4 \cdot H_2O$ crystals from the barren $MgSO_4$ solution. The fifth stream, if there are sufficient quantities, may yield a magnesia product.

(11) The water from the crystallizer is advantageously recirculated into the leaching operations of the present invention.

(12) If pyrite is used as the sulfur-bearing material in the thermal decomposition of magnesium sulfate as described hereinbefore, it is useful to place a magnetic separator, as shown in the drawing in dotted lines, in a position to remove iron materials before injecting any magnesia into either of the two precipitators.

While the present invention has been more particularly described with specific reference to a process employing a double-stage magnesia neutralization, any one or more of steps 8 through 12 may be advantageously employed for the purposes discussed therein with other nickel recovery processes such as a single-stage magnesia precipitation, as those skilled in the art will readily understand. More advantageously, all of steps 8 through 12 are employed for the reasons set forth therein.

The present invention is particularly adapted for use in the recovery of nickel, cobalt and/or nickel and cobalt values from oxidic nickeliferous ores, e.g., lateritic ores of the limonite type. These ores contain, on an average, from 0.5% to 2% nickel, up to 0.5% cobalt, up to 50% or more of iron, up to 10% silicon (as silica) and up to 5% aluminum. They may also contain up to 4% chromium, up to 0.1% copper, up to 0.1% lead, up to 2% manganese and up to 8% magnesia. In addition, because the process of this invention wastes little sulfur, it can be succesfully employed in the acid-leach treatment of nickeliferous serpentine ores (hydrous magnesium silicate minerals) containing as much as 10% or more MgO, e.g., 12%. In contrast thereto, the prior art hydrometallurgical acid-leach treatments of nickeliferous oxidic ores are usually limited to those materials containing not more than 1½% or 2% magnesia because the acid requirements to neutralize the contained MgO seriously upsets the economics of those processes. In the same connection, even the prior art ammonia-leaching proces is economically restricted to those ores containing less than 6% magnesia.

The present invention is also useful in economically (because of its nonevaporative crystallization features) recovering magnesium sulfate in a commercially attractive state and form from dilute solutions obtained from a wide variety of sources, e.g., the nickel recovery process of this invention, other nickel recovery processes where either magnesia or magnesium sulfate is encountered, mother liquors, brines, etc. Moreover, the present invention may also be utilized in recovering magnesia from magnesium sulfate crystals or solutions and, if employed for that purpose, a sulfur dioxide and/or sulfur trioxide byproduct is also obtained which is useful in the preparation of sulfuric acid or oleum.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

I claim:

1. A hydrometallurgical process for recovering nickel from nickeliferous oxidic material containing up to 12% magnesia and iron which comprises pressure leaching the oxidic material with sulfuric acid at a temperature of 400° to 500° F. to produce a very acidic leach sulfate solution and unleached solids, adding magnesia to the leach solution until it has a pH of between 3.5 and 5 so that iron is precipitated as a hydroxide, separating the iron hydroxide from the remaining solution, contacting the remaining solution with magnesia until the pH is at least 7 to form a nickel hydroxide precipitate and a barren solution containing magnesium sulfate, nonevaporatively crystallizing the magnesium sulfate from the barren solution in the form of magnesium sulfate monohydrate crystals by subjecting the barren solution to a temperature of 370° to 480° F. while under a pressure which is at least equal to the vapor pressure of the barren solution at that temperature, collecting said crystals and then thermally decomposing said crystals at a temperature of at least 1350° F. to form magnesia and a sulfur-containing gas selected from the group consisting of sulfur dioxide, sulfur trioxide and combinations thereof.

2. A process as claimed in claim 1 wherein the nonevaporative crystallization is conducted at a temperature of between 390° and 470° F. and at least a portion of the magnesia formed by the thermal decomposition of magnesium sulfate crystals is recycled into the process to supply at least a portion of the magnesia added to bring the pH of the leach solution up to between 4 and 5.

3. A process as claimed in claim 1 wherein the nonevaporative crystallization of magnesium sulfate from the barren solution is carried out in the presence of magnesium sulfate crystals.

4. A process as claimed in claim 1 wherein the sulfuric acid is concentrated sulfuric acid and wherein the remaining solution is charged with hydrogen sulfide to precipitate any copper and any lead present.

5. A process as claimed in claim 2 wherein at least a portion of the magnesia formed by the thermal decomposition of magnesium sulfate crystals is recycled into the process to supply at least a portion of the magnesia added to bring the pH of the leach solution up to between 4 and 5 and to supply at least a portion of the magnesia contacting the remaining solution to bring the pH of the remaining solution up to at least 8.

6. A process as claimed in claim 2 wherein the thermal decomposition is carried out in the presence of a sulfur-bearing material and wherein the nonevaporative crystallization of magnesium sulfate from the barren solution is carried out in the presence of magnesium sulfate crystals.

7. A process as claimed in claim 6 wherein the sulfur-bearing material is selected from the group consisting of brimstone, sulfur, pyrite and combinations thereof and wherein the nonevaporative crystallization of magnesium sulfate from the barren solution is conducted in the presence of sufficient magnesia to maintain the pH of the barren solution above 3.5 during nonevaporative crystallization.

8. A process as claimed in claim 7 wherein the nonevaporative crystallization is conducted in the presence of sufficient magnesia to maintain the pH of the barren solution above 4.5 during nonevaporative crystallization.

9. A process as claimed in claim 7 wherein, prior to nonevaporative crystallization, the barren solution containing magnesium sulfate is carbonated to precipitate any calcium present and thereby substantially inhibiting gypsum-scaling.

10. A process for recovering magnesium sulfate monohydrate from a dilute solution which comprises crystallizing the magnesium sulfate from the dilute solution by subjecting the solution to a temperature of between 370° and 480° F. while under a pressure which is at least equal to the vapor pressure of the dilute solution at that temperature and conducting the crystallizing in the presence of sufficient magnesia to maintain the pH of the dilute solution above 3.5 during the crystallizing of magnesium sulfate monohydrate.

11. A process as claimed in claim 10 wherein the crystallizing is carried out in the presence of magnesium sulfate crystals and in the presence of sufficient magnesia to maintain the pH of the dilute solution above 4.5 during the crystallizing of magnesium sulfate monohydrate from the dilute solution.

12. A process for recovering magnesia from a dilute solution of magnesium sulfate which comprises crystallizing the magnesium sulfate from the dilute solution by subjecting the solution to a temperature of between 370° and 480° F. while under a pressure which is at least equal to the vapor pressure of the dilute solution at that temperature, conducting the crystallizing in the presence of sufficient magnesia to maintain the pH of the dilute solution above 3.5 during the crystallizing of magnesium sulfate monohydrate crystals and thermally decomposing the magnesium sulfate crystals at a temperature of at least 1350° F. and in the presence of a sulfur-bearing material.

13. A process as claimed in claim 12 wherein the sulfur-bearing material is selected from the group consisting of brimstone, sulfur, pyrite and combinations thereof.

14. A process as claimed in claim 13 wherein the crystallizing is carried out in the presence of magnesium sulfate crystals and in the presence of sufficient magnesia to maintain the pH of the dilute solution above 4.5 during the crystallizing of magnesium sulfate monohydrate from the dilute solution.

15. In a process for recovering nickel hydrometallurgically from a nickeliferous oxidic material containing up to 10% magnesia wherein the material is subjected to a leach-step with sulfuric acid to place the nickel values in solution and the nickel is precipitated from the leach solution with magnesia to form nickel hydroxide and a barren magnesium sulfate solution, the improvement which comprises crystallizing the magnesium sulfate from the barren solution by subjecting the solution to a temperature of between 390° and 470° F. while under a pressure which is at least equal to the vapor pressure of the barren solution at that temperature, conducting the crystallizing in the presence of magnesium sulfate crystals and in the presence of sufficient magnesia to maintain the pH of the barren solution above 4.5 during the crystallizing of magnesium sulfate monohydrate crystals, separating the crystals from the liquor, thermally decomposing magnesium sulfate crystals at a temperature of at least 1650° F. in the presence of kieserite and a sulfur-bearing substance selected from the group consisting of brimstone, sulfur, pyrite and combinations thereof to form magnesia and a sulfur-containing gas selected from the group consisting of sulfur dioxide, sulfur trioxide and combinations thereof, making at least a portion of the sulfuric acid for leaching the nickeliferous oxidic material with the sulfur-bearing gas, recycling at least a portion of the magnesia formed by thermally decomposing the magnesium sulfate crystals to supply a portion of the magnesia used to precipitate the nickel as its hydroxide and recirculating at least a portion of the liquor resulting from the magnesium sulfate crystallization to the leach step of the process.

References Cited

UNITED STATES PATENTS

| | | | |
|---|---|---|---|
| 2,899,300 | 8/1959 | Bailey | 75—101 |
| 3,146,091 | 8/1964 | Green | 75—115 X |
| 3,244,513 | 4/1966 | Zubryckyj et al. | 75—119 |

OTHER REFERENCES

Mellor: "Comprehensive Treatise on Inorganic and Theoretical Chemistry," vol. 4, 1923, p. 324.

Kirk-Othmer: Encyclopedia of Chemical Technology, vol. 8, 1952, pp. 613–615.

EDWARD J. MEROS, Primary Examiner

U.S. Cl. X.R.

23—123, 167, 174, 177, 201, 301, 304; 75—101, 108, 115, 119